United States Patent
Korneluk et al.

(10) Patent No.: US 7,277,049 B2
(45) Date of Patent: Oct. 2, 2007

(54) METHOD FOR PROVIDING LOCATION AIDING AMONG PEERS OPERATING IN A DIRECT COMMUNICATION MODE

(75) Inventors: Jose E. Korneluk, Boynton Beach, FL (US); Bobby D. Anderson, Gilbert, AZ (US); Kristi A. Haverkamp, Chandler, AZ (US); Keith M. Klug, Mesa, AZ (US); Charles H. Segerson, Tempe, AZ (US); Nereydo T. Contreras, Miramar, FL (US); Charles B. Swope, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 9 days.

(21) Appl. No.: 11/194,011

(22) Filed: Jul. 29, 2005

(65) Prior Publication Data

US 2007/0024498 A1    Feb. 1, 2007

(51) Int. Cl.
*H04B 7/185* (2006.01)
(52) U.S. Cl. .............. 342/357.09; 342/357.1; 342/357.15
(58) Field of Classification Search ........ 342/357.09, 342/357.1, 357.15; 455/456.1–456.3, 456.6
See application file for complete search history.

(56) References Cited

U.S. PATENT DOCUMENTS

| | | | | |
|---|---|---|---|---|
| 5,365,450 A | * | 11/1994 | Schuchman et al. | 455/456.3 |
| 5,726,893 A | * | 3/1998 | Schuchman et al. | 455/456.3 |
| 6,014,102 A | * | 1/2000 | Mitzlaff et al. | 342/457 |
| 6,140,956 A | * | 10/2000 | Hillman et al. | 342/357.07 |
| 6,246,376 B1 | * | 6/2001 | Bork et al. | 343/760 |
| 6,323,803 B1 | * | 11/2001 | Jolley et al. | 342/357.03 |
| 6,421,002 B2 | * | 7/2002 | Krasner | 342/357.1 |
| 6,470,189 B1 | * | 10/2002 | Hill et al. | 455/517 |
| 7,149,534 B2 | * | 12/2006 | Bloebaum et al. | 455/456.6 |
| 2002/0098849 A1 | * | 7/2002 | Bloebaum et al. | 455/456 |
| 2004/0192345 A1 | * | 9/2004 | Osborn et al. | 455/456.1 |
| 2005/0062643 A1 | * | 3/2005 | Pande et al. | 342/357.1 |
| 2006/0009240 A1 | * | 1/2006 | Katz | 455/457 |

OTHER PUBLICATIONS http://www.oreillynet.com/lpt/a/527—O'Reilly Wireless DevCenter: An Introduction to Differential GPS by Chriss Halsall Dec. 29, 2000-5 pages.

* cited by examiner

*Primary Examiner*—Thomas H. Tarcza
*Assistant Examiner*—Shelley Chen
(74) *Attorney, Agent, or Firm*—Scott M. Garrett

(57) ABSTRACT

A mobile communication device (202) outside the service area of a communications network 210 in need of satellite positioning assistance information to perform a location determination (308). The mobile communication device receives the assistance information from a peer mobile communication device (204, 206) over a direct link.

6 Claims, 5 Drawing Sheets

METHOD FOR PROVIDING LOCATION AIDING AMONG PEERS OPERATING IN A DIRECT COMMUNICATION MODE

TECHNICAL FIELD

The invention relates in general to mobile communication devices, and more particularly to mobile communication devices that have a positioning receiver operable in an autonomous location determination mode, and where the mobile communication device is operable in a direct communication, off-network mode.

BACKGROUND OF THE INVENTION

Mobile communication devices are in widespread use throughout metropolitan regions of the world. These devices are increasingly common and affordable, and to remain competitive manufactures have sought to include additional functionality in them. For example, manufacturers are now including positioning receivers in mobile communication devices to support a number of location applications, such as location reporting for emergency services, and navigation.

The use of satellite positioning receivers in mobile communication devices was initially driven by safety concerns related to locating a person calling emergency services using a mobile communication device. Although it is simple to determine the cell location of a mobile caller, the area encompassed by a cell may be quite large, especially in rural areas. Therefore some governments are now requiring that mobile communication devices include a means for determining their own location and reporting it when necessary, such as when the mobile communication device user calls an emergency phone number. Although numerous methods of approximate location determination have been developed, using such techniques as triangulation and relative power levels of signals received from base station radios in the vicinity of the mobile communication device, these methods have not proven sufficiently reliable or precise.

The preferred means of providing location determination in a mobile communication device is to include a satellite positioning receiver. However, this approach is not without significant design challenges. For one, the time needed for a satellite positioning receiver to lock onto a sufficient number of positioning satellite signals from an autonomous or "cold" start can be significant, taking several minutes or more. This is due to the number of unknown variables the satellite positioning receiver must determine when commencing a cold start. For one, the satellite positioning receiver must know which satellites are presently in view to search for the signals transmitted by those satellites, otherwise the positioning receiver must search for each satellite until it determines which ones are presently in view. The ephemeris orbital parameters, and related parameters such as Doppler shift are of significant assistance if known before initiating a location fix. The present time of day and approximate location are very helpful. This type of aiding information may be available from a communication system, and may be transmitted to the mobile communication device from, for example, a base station in a cellular telephony system. Aiding information received from the network is referred to as network aiding. Network aiding will reduce the time to first fix to a few seconds to a minute, depending on signal conditions. Network aiding involves transmitting information to reduce the search time of the satellite positioning receiver, and may include time of day, approximate location, and satellite ephemeris. However, when the mobile communication device is out of range of the communication system, is not designed to access a communication system, or when the communication system does not support satellite positioning location aiding, the mobile communication device must often perform a cold start in determining its location.

However, some mobile communication devices are being manufactured with the ability to communicate directly with other mobile communication devices for use in remote areas, outside of communication system coverage. In situations where the mobile communication device is outside the coverage area of a communication system, the precision frequency signal is unavailable. Therefore there is a need for a way in which a mobile communication device operating in a remote area outside the coverage of a communication system can reduce the time needed to perform a location determination.

DETAILED DESCRIPTION

Figure 1:
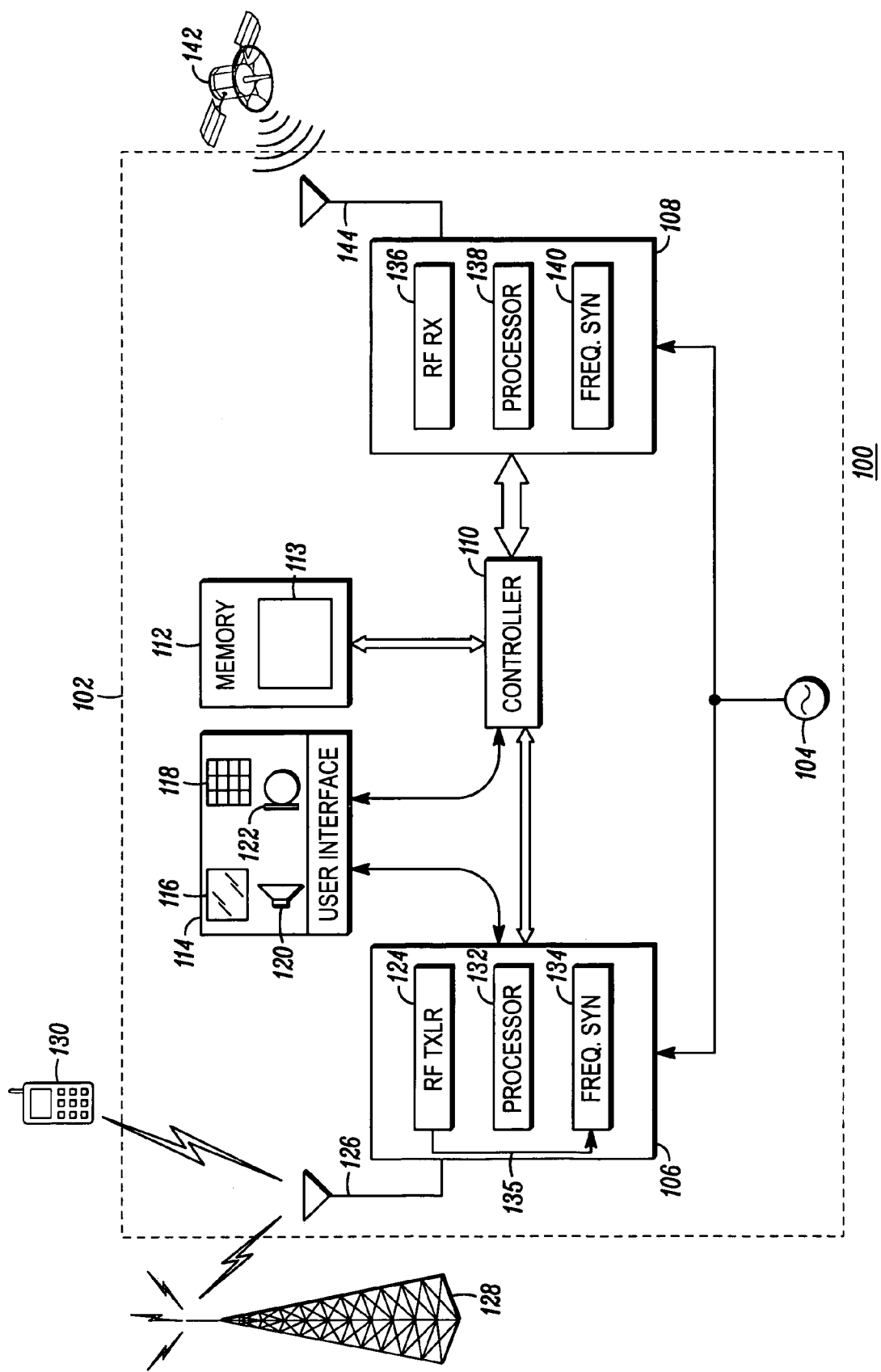
FIG. 1 shows a block schematic diagram of a mobile communication device in accordance with an embodiment of the invention.

While the specification concludes with claims defining the features of the invention that are regarded as novel, it is believed that the invention will be better understood from a consideration of the following description in conjunction with the drawing figures, in which like reference numerals are carried forward.

The invention solves the problem of the long time needed to acquire positioning signals at a mobile communication device when the mobile communication device is operated out of range of a communication system and has not otherwise received satellite positioning assistance information by receiving a satellite positioning assistance message directly from a peer mobile communication device which has determined its location using a satellite positioning receiver. The peer mobile communication device transmits satellite positioning assistance information to the mobile communication device which has not determined its location, which avoids having to perform a complete search for positioning satellite signals.

Referring now to FIG. 1, there is shown a block schematic diagram 100 of a mobile communication device 102, in accordance with an embodiment of the invention. The mobile communication device 102 includes a reference oscillator 104 that may be shared between a communications transceiver 106 and a satellite positioning receiver 108. Both the communication transceiver and the satellite positioning receiver are operated under control of a controller 110, in accordance with executable machine readable instruction code 113 stored on a machine readable memory 112 of the mobile communication device. The controller further operates a user interface 114 to allow a user of the mobile communication device to interact with the mobile communication device and view information displayed by the mobile communication device and give commands to operate the mobile communication device. Typically the user interface includes a display 116 for displaying information to the user; a keypad 118 and buttons for entering information and commands; and an audio system including at least a speaker 120 for playing audio signals and a microphone 122 for converting acoustic signals to electrical signals.

The communications transceiver 106 maybe a conventional radio-telephony transceiver, such as one operating according to any of the well known air interfaces, and is capable of sending and receiving messaging in addition to voice and audio signals. The communications transceiver includes a radio frequency transceiver 124 coupled to an antenna 126 for communicating radio signals to and from communication system base stations 128 but is also capable of direct radio communication with other so-equipped mobile communication devices 130. Direct radio communication is performed by asynchronous radio transmissions between two or more mobile communication devices. An example of direct mode communication is given in published United States patent application no. 20040190652 in the name of Gamble et al, which is assigned to Motorola, Inc. It is preferable that in using the direct communication mode the communications transceiver uses the same RF transceiver for the direct communication mode as it does for communicating with the communication system base station. In particular it may use a single RF power amplifier for both modes of communication.

The RF transceiver performs modulation, demodulation, tuning control, and other radio frequency operations. The RF transceiver is operably coupled to a processor 132 which processes data to be transmitted, as well as data received over the RF transceiver. Functions include, for example, mapping digital data onto quadrature constellations, forward error encoding and decoding, digital filtering, and so on, as is well known in the art. The communications transceiver is further operably coupled to the user interface to provide audio signals to be played over a speaker 120 of the user interface, as well as to receive audio signals produced from a microphone 122 of the user interface. The communications transceiver also includes a local frequency synthesizer 134 which generates the operating frequency of the RF transceiver in accordance with a tuning input. To tune the communications transceiver of the mobile communication device the frequency synthesizer is adjusted so that an output frequency 135 of the frequency synthesizer used to down-mix a signal received at the communications transceiver is substantially equal to the frequency of the signal to be received. Likewise, for signals transmitted by the mobile communication device, the frequency synthesizer is tuned to the frequency at which the signal is to be transmitted. Furthermore, multiple frequencies may be generated for heterodyne operation, as is known. Frequency synthesizers typically are tuned using a digital tuning word which corresponds to the desired frequency. The digital tuning word is typically provided by a controller or other processor, and may be latched at the frequency synthesizer. The digital control words may be derived in correspondence with the desired frequency output, or they may be stored in a table in the memory of the mobile communication device in correspondence with frequencies or channel numbers, for example. As it is known that the reference oscillator, from which the operating frequency is generated, may drift or otherwise be imprecise, it is routine to tune the frequency synthesizer from an uncorrected nominal value to a value offset from the uncorrected nominal value to correct for frequency errors so that the operating frequency is substantially the desired frequency. This may be performed, for example, by sweeping the tuning value in a window around the uncorrected nominal tuning value until a signal is detected, and further refinement may occur to determine the precise tuning value yielding the strongest signal. Sweeping frequency bands is commonly used for detecting signals when operating in an asynchronous direct communication mode.

Similar to the communications transceiver, the positioning receiver 108 includes a radio frequency receiver 136 for receiving positioning satellite signals, a processor 138 for processing the received signals, and a tunable frequency synthesizer 140 for generating operating frequencies from the reference oscillator 104. The positioning receiver receives signals from positioning satellites 142 in orbit around the Earth via an antenna 144. In order to determine its location, the positioning receiver preferably receives the signals of four satellites. Three satellites may be used if one or more location parameters, such as elevation, is assumed. With each different satellite, the operating frequency ranges must be searched to locate different satellites, and due to Doppler shift in the signals as the satellites orbit, the offset used in relation to a nominal frequency for one satellite will likely not apply to another satellite. The process of searching for a sufficient number of positioning satellite signals, and then decoding those signals, and then performing the necessary calculations can take several minutes if the positioning receiver has no information relevant to the process before starting the process. However, it is common that positioning receivers can be seeded with information to significantly reduce the time it takes to perform a location determination. This seed information may include satellite almanac information, satellite ephemeris information, approximate location of the receiver, approximate time of day and date, and so on, as is known in the art. The more assistance information that is available, the less time is needed to make a location determination. The time can be reduced to substantially less than one minute in many cases.

Figure 2:
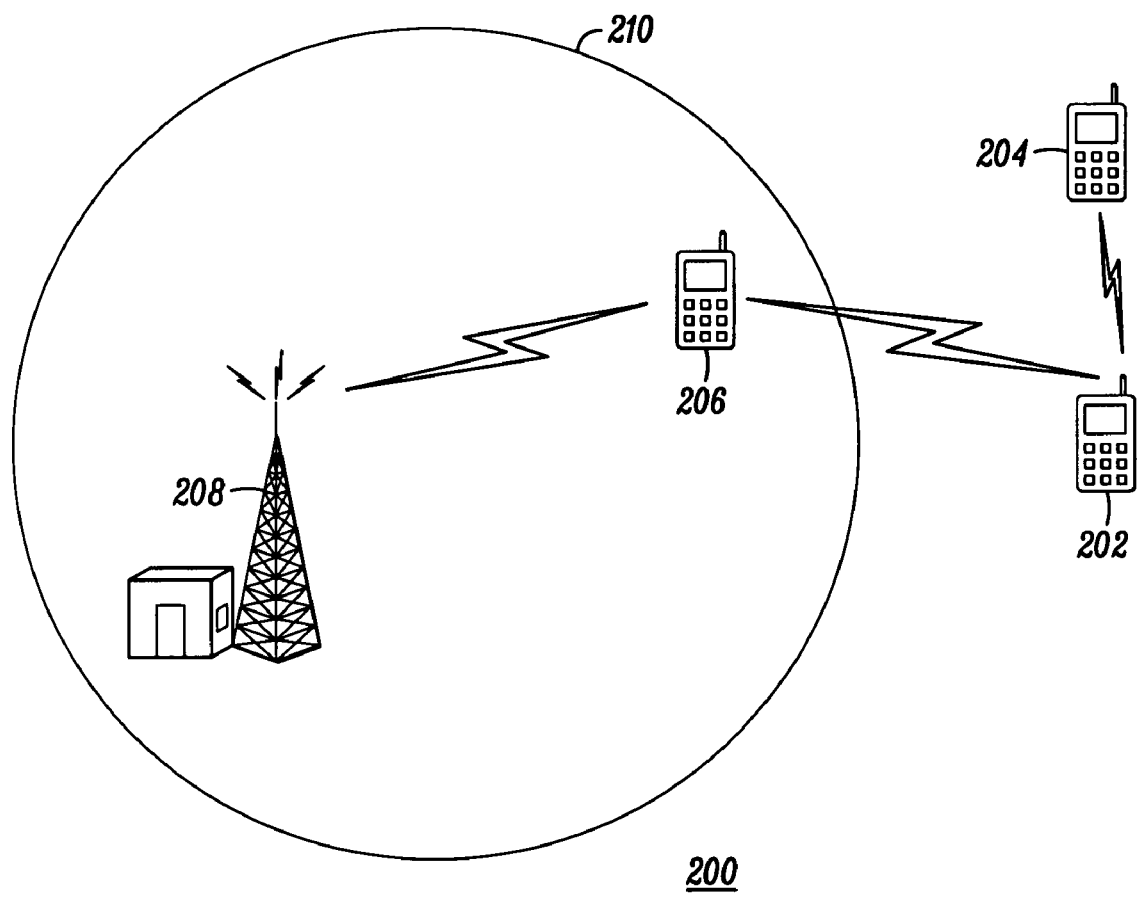
FIG. 2 shows a diagram illustrating peer to peer calling, in accordance with an embodiment of the invention.

According to the invention, the mobile communication device 102 communicates with a peer mobile communication device 130 to receive satellite positioning assistance information to facilitate location determination in a reduced time compared to a "cold" start. Referring now to FIG. 2, there is shown a diagram 200 illustrating peer to peer communication, in accordance with an embodiment of the invention. A mobile communication device 202 may be situated outside the border 210 of a communication system base station 208 and may be outside the range of any communication system, or it may be incapable of communication with any communication system, and only able to directly communicate with other mobile communication devices. The mobile communication device 202 is within direct range of peer mobile communication devices 204, 206. Peer mobile communication device 206 is within range of base station 208, and is therefore able to receive satellite positioning assistance information from the base station, if the such functionality is supported by the base station and communication system.

Peer mobile communication device 204 is, like mobile communication device 202, outside the range of the base station 208, but, according to the invention, has performed a location determination, and having done so, has current satellite positioning assistance information. The mobile communication devices 202, 204, and 206 may all be capable of direct communication with each other, such as by asynchronous communication in the Industrial, Scientific, and Medical frequency bands (902-928 MHz, 2400-2483 MHz, 5725-5780 MHz), which permits for unlicensed radio communication operation, as is known. Direct communication may also be performed in other bands using other protocols. In order for the mobile communication device 202 to determine its location with no relevant information beforehand, it could perform an autonomous location determination, but as mentioned that could take several minutes, or longer. To reduce the time to perform a location determination, the mobile communication device 202 receives a signal transmitted by one of the peer mobile communication devices 204, 206. Mobile communication device 202 may be one of a group of mobile communication devices in the vicinity of mobile communication devices 204, 206 which receive the signal at the same time. Furthermore, it is also contemplated that mobile communication device 206, which is within range of the communication system, may not be able to receive satellite positioning assistance information from the communication system, as when the communication system does not support provision of such information. In such a case, the mobile communication device 206 may still receive the satellite positioning assistance information from one of the other peer mobile communication devices 202, 204, which may be outside the range of a communication system, or presently affiliated with communication system as well. It should be noted that the mobile communication devices may not be cable of communicating with any communications system, and are only capable of direct communication with other similarly equipped mobile communication devices.

Figure 3:
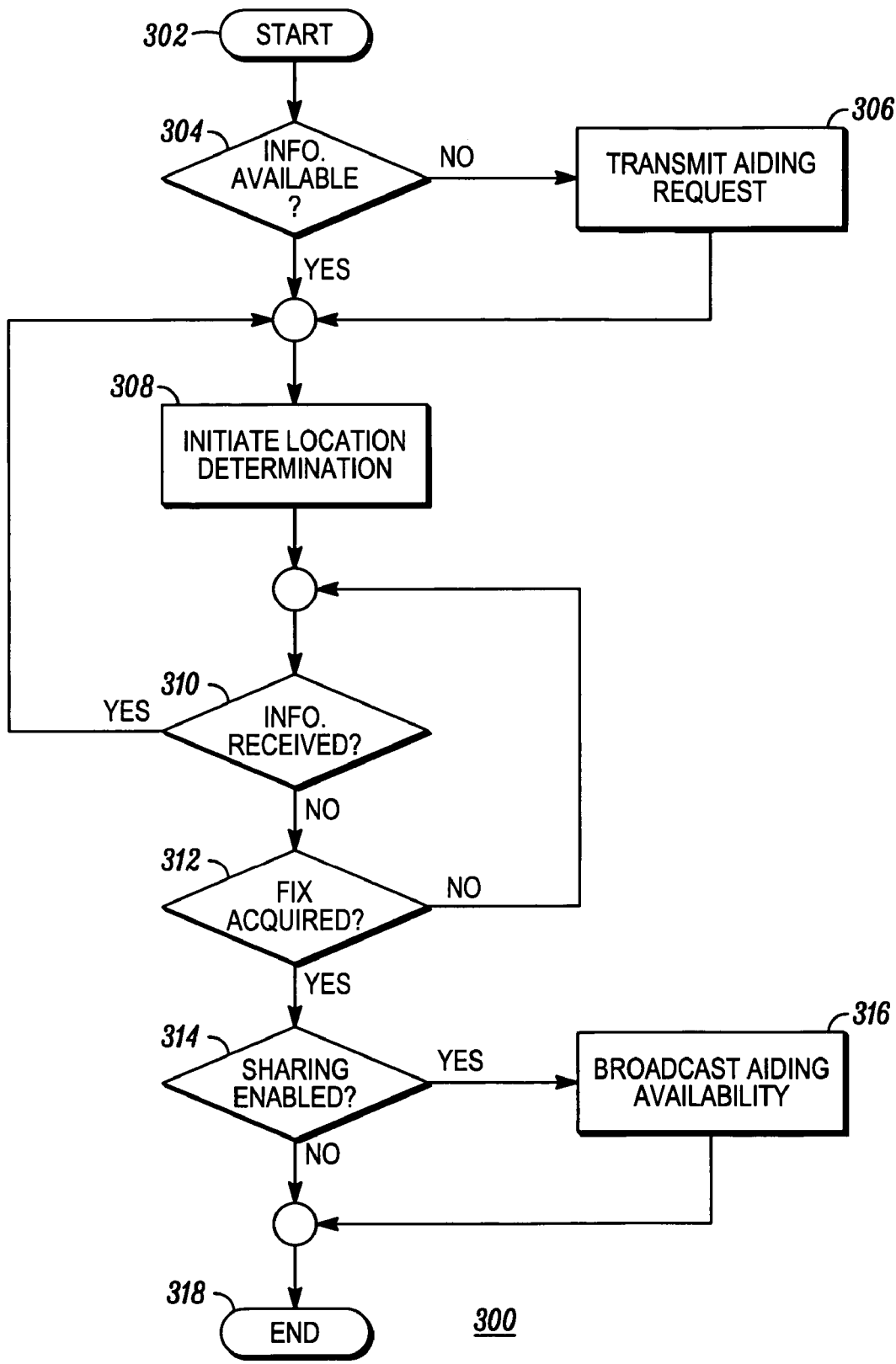
FIG. 3 shows a flow chart diagram of a method of providing satellite positioning assistance information from a first peer mobile communication device to a second peer mobile communication device, in accordance with an embodiment of the invention.

Referring now to FIG. 3, there is shown a flow chart diagram 300 of a method of providing satellite positioning assistance information from a first peer mobile communication device to a second peer mobile communication device, in accordance with an embodiment of the invention. The flow chart is representative of one way to implement processes of the invention at the mobile communication device seeking and receiving the satellite positioning assistance information from another mobile communication device. At the start 302 the mobile communication device is powered on and ready to engage in communication activity. An initial process to be performed is determining whether the mobile communication device presently has assistance information for use in location determinations, as indicated at decision block 304. If the mobile communication device does not have information, or if the information is too old, the mobile communication device transmits an assistance request, as indicated by block 306. The transmitting can be targeted to another particular mobile communication device if known to be in the vicinity of the mobile communication device, or it may be broadcast to all mobile communication device within radio range. Alternatively, it is contemplated that the transmission may be performed over a non-radio link between the mobile communication device and a peer mobile communication device, such as by an infrared, acoustic, cable, or magnetic means, for example. According to the present embodiment of the invention, once the mobile communication device transmits the request for the assistance information, it commences a location determination, to be performed by the satellite positioning receiver of the mobile communication device, as indicated at block 308. While the positioning receiver is searching for and processing positioning satellite signals, the mobile communication device periodically checks to see if a peer mobile communication device is transmitting the assistance information, as indicated by block 310. This process is repeated until the assistance information is received, in which case it will restart the location determination process using the assistance information, or until a fix (the mobile communication device's location) has been determined, as indicated by block 312. Once the fix has been acquired, the mobile communication device can then form a set of assistance parameters, which may be shared with other mobile communication devices, if permitted, as indicated by block 314. If the mobile communication device is designed to share assistance information, and is so permitted, or in response to an assistance request, of permitted, the mobile communication device may transmit the assistance information to another mobile communication device, such as by broadcast, as indicated by block 316. Other alternative means may be used to transfer the assistance information, as referred to hereinabove. Furthermore, the transmission may be targeted to a particular mobile communication device, such as by an identification number or other identifier, or it may be broadcast. If broadcast, the broadcasting may be performed autonomously, or in response to a broadcast assistance request. The method ends, as indicated by block 318, for example, when the user shuts off the mobile communication device, or if after acquiring a location fix the mobile communication device is not allowed to transmit assistance information.

Figure 4:
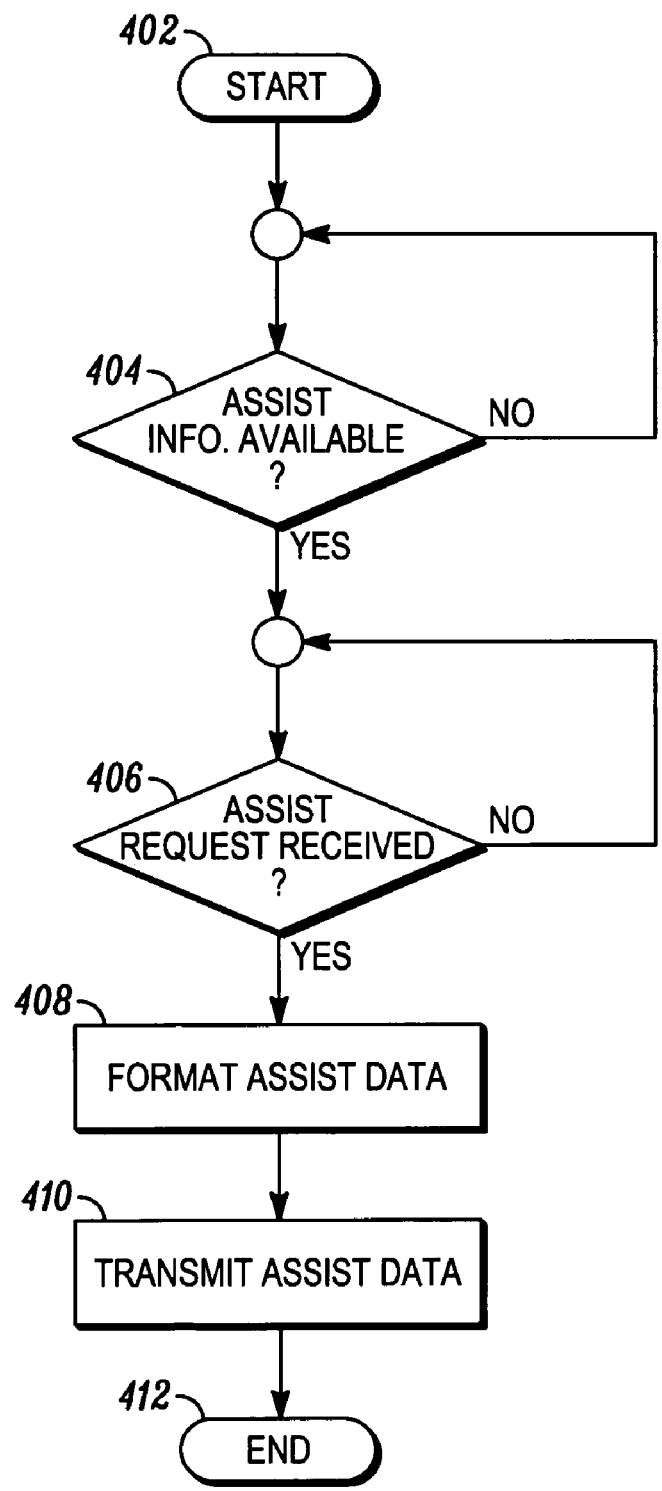
FIG. 4 shows a flow chart diagram representative of a method for transmitting satellite positioning assistance information, in accordance with an embodiment of the invention.

Referring now to FIG. 4, there is shown a flow chart 400 representative of a method for transmitting satellite positioning assistance information, in accordance with an embodiment of the invention. At the start 402 of the method the mobile communication device is powered on and is ready to engage in communication activity. According to the present embodiment, the mobile communication device may first determine if a satellite positioning assistance information is available, as indicated by block 404. The assistance information may be available due to a recent location fix being performed. If not, the mobile communication device may then commence performing a location fix, and may itself use the method of FIG. 3 to acquire the location fix. Once the location fix has been acquired, the mobile communication device also has the requisite parameters to provide satellite positioning assistance information to other mobile communication devices. According to the present embodiment, the mobile communication device may then commence waiting to receive or detect a location assistance request message, as indicated by block 406. The request message may be received over the air via radio signals, or through another means of linking the mobile communication device to another mobile communication device. Upon receiving the request message, the mobile communication device may commence formatting the assistance information, and then transmitting the assistance information, as indicated by blocks 408, 410, respectively. It is contemplated that the request may be received via one mode of communication, and the assistance information transmitted via a different mode of communication. For example, the request may be received via a radio signal, and the mobile communication device may transmit the assistance information via an infrared optical link, assuming the mobile communication devices are within sufficient proximity to each other. The method ends 412 upon transfer of the assistance information, which may include an acknowledgement by the receiving mobile communication device.

Figure 5:
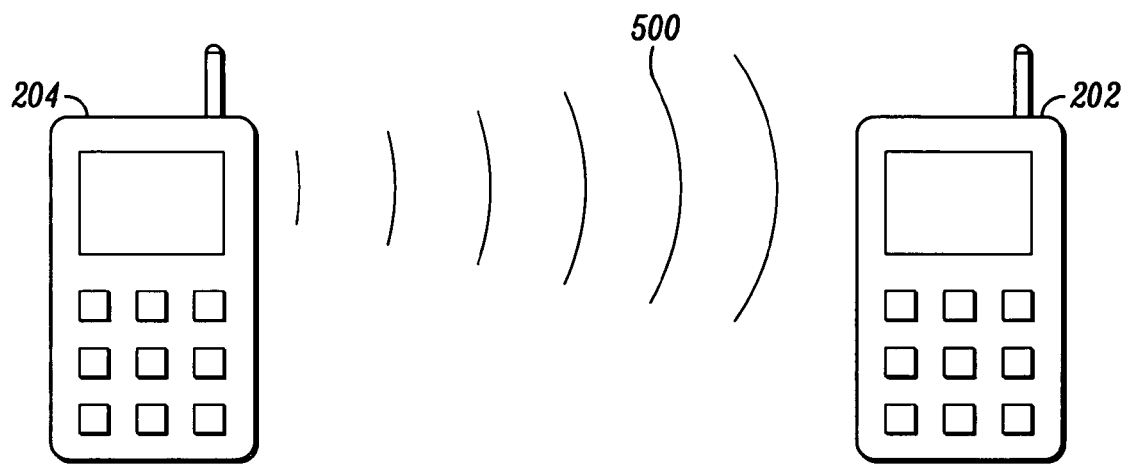
FIGS. 5 and 6 show alternative means by which satellite positioning assistance information may be transmitted from a first mobile communication device to a second mobile communication device, in accordance with an embodiment of the invention.
Figure 6:
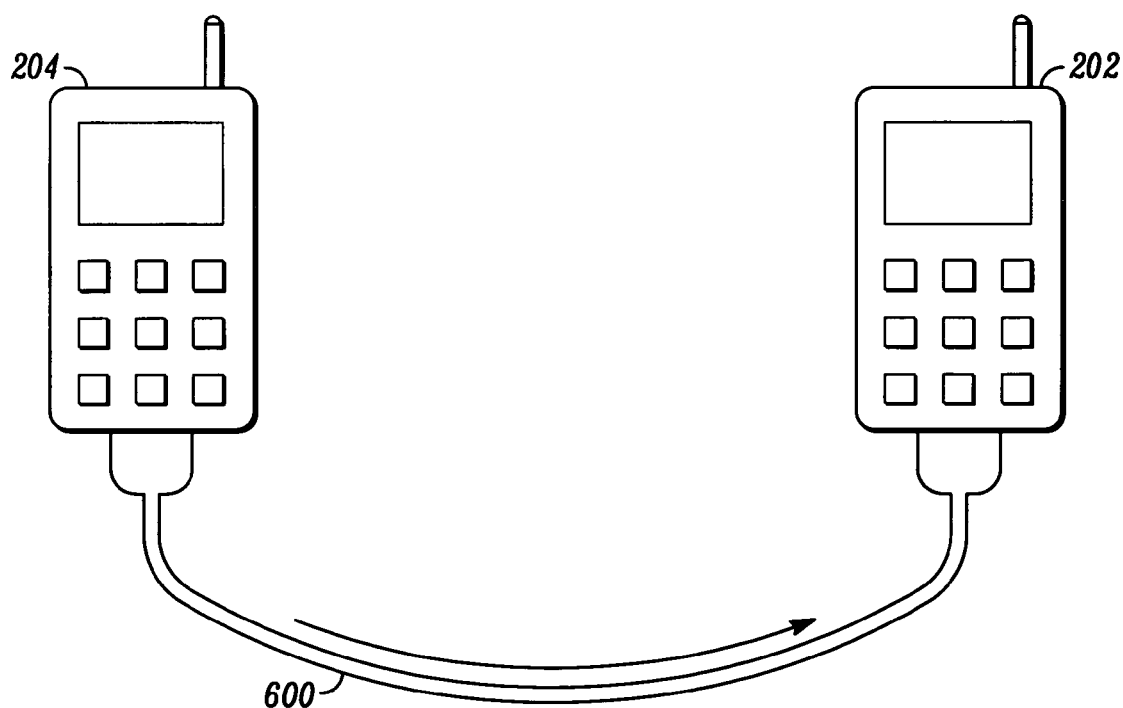

Referring now to FIGS. 5 and 6, there is shown alternative means by which satellite positioning assistance information may be transmitted from a first mobile communication device to a second mobile communication device, in accordance with an embodiment of the invention. In FIG. 5, the mobile communication device 204 may transmit assistance information to mobile communication device 202 via an infrared or acoustic link 500. In FIG. 6 the mobile communication devices are shown connected by a cable 600. These communication means may be sued when the mobile communication devices are in close physical proximity as an alternative to a direct radio link.

Therefore, the invention provides a method of providing satellite positioning assistance information from a first mobile communication device to a second mobile communication device, the first mobile communication device having current satellite positioning assistance information. The method requires establishing an information link directly between the first and second mobile communication devices. By directly it is meant that there is no intervening system or processing between the two mobile communication devices. The mobile communication device in need of the assistance information commences requesting the current satellite positioning assistance information from the first mobile communication device. It is contemplated that requesting the assistance information may occur prior to the establishment of the communication link, such as if the mobile communication device broadcasts a request message. Once the mobile communication device having the assistance message receives the request, it commences transmitting the information. Accordingly, the mobile communication device that requested the assistance information commences receiving the current satellite positioning assistance information from the transmitting mobile communication device over the information link. Upon receiving the assistance information, the receiving mobile communication device passes the assistance information to the satellite positioning receiver and commences performing a satellite positioning location determination. The result of the satellite positioning determination is a location fix in latitude and longitude, describing the mobile communication device's global location. The satellite positioning assistance information may include satellite ephemeris, satellite almanac, approximate position, present time of day, or any combination thereof. It is contemplated that the information exchange link may be established via an asynchronous radio link between the mobile communication devices. In an asynchronous radio link the receiving mobile communication device must detect and tune to the signal transmitted by the transmitting mobile communication device, and track timing and frequency of the transmitted signal. Unlike a conventional multiple access communication system, an asynchronous signal may be transmitted at any time, and not according to a predefined time slot, for example. Alternatively, it is contemplated that the information exchange link may be performed by one of an infrared link, acoustic link, cabled link, or a magnetic induction link. If a radio link is to be used, then it is contemplated that requesting the current satellite positioning assistance information is performed before establishing the information exchange link. The requesting may be performed by broadcasting a request message from the mobile communication device while operating in the asynchronous direct radio mode. Although the mobile communication devices may communicate directly with each other, it is further contemplated that the mobile communication device may be operated within range of a communications network with which the mobile communication device is initially associated, the method further comprises initiating an off-network mode prior to establishing the information exchange link. Switching between an on-network mode, where the mobile communication device is associated with the communication system, and the off-network mode to communicate directly with another mobile communication device may be necessary if the mobile communication device has only one communications transceiver. It is further contemplated that, in order to save time in case no response is received, the mobile communication device may initiate a satellite positioning location determination prior to receiving the current satellite positioning assistance information, and while commencing the satellite positioning location determination, periodically checking an asynchronous radio channel to detect the transmitting of the current satellite positioning assistance information by the peer mobile communication device.

The invention further provides a mobile communication device comprised of a communications transceiver, a satellite positioning receiver, and a machine readable memory containing instruction code. The instruction code is executable by a processor and includes the necessary instructions for operating the mobile communication device in accordance with the invention, including establishing an information link directly with a peer mobile communication device, and requesting current satellite positioning assistance information from the peer mobile communication device. If a peer mobile communication device responds, the instruction code facilitates receiving the current satellite positioning assistance information from the peer mobile communication device over the information link. Upon receipt of the current satellite positioning assistance information, the instruction code facilitates performing a satellite positioning location determination with the satellite positioning receiver using the current satellite positioning assistance information.

The invention further provides a method of assisting a peer mobile communication device perform a satellite positioning location determination by acquiring a satellite positioning fix at a first mobile communication device. Upon acquiring the fix, the mobile communication device has acquired satellite positioning parameters, such as ephemeris, satellite almanac, approximate position, and present time of day. The mobile communication device may then commence formatting the satellite positioning parameters into a current satellite positioning assistance information format. That is, the particular parameters to be transmitted in an assistance response may be selected from all the positioning data and stored in a particular memory location in anticipation of transmission. Upon receiving a request from a second mobile communication device for the current satellite positioning assistance information, the mobile communication device commences transmitting the current satellite positioning assistance information to at least the second mobile communication device. In addition to the second mobile communication device, the first mobile communication device may transmit the assistance information to several other mobile communication devices at the same time via a broadcast or group call. The mobile communication device may, as mentioned hereinabove, use a variety of communications medium, including an asynchronous radio link, and local non-radio links.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of providing satellite positioning assistance information from a first mobile communication device to at least a second mobile communication device, the first mobile communication device having current satellite positioning assistance information, the method comprising:
    establishing an asynchronous radio link directly between the first and second mobile communication devices;
    requesting the current satellite positioning assistance information from the first mobile communication device at the second mobile communication device;
    receiving the current satellite positioning assistance information from the first mobile communication device to the second mobile communication device over the asynchronous radio link; and
    performing a satellite positioning location determination at satellite positioning receiver of the second mobile communication device using the current satellite positioning assistance information;
    wherein performing satellite positioning location determination is commenced prior to receiving the current satellite positioning assistance information, and wherein, while commencing the satellite positioning location determination before receiving the current satellite positioning assistance information, the second mobile communication device periodically checks an asynchronous radio channel to detect the first mobile communication device transmitting the current satellite positioning assistance information.

2. A method of providing satellite positioning assistance information as defined by claim 1, wherein the current satellite positioning assistance information includes at least one of satellite ephemeris, satellite almanac, approximate position, and present time of day.

3. A method of providing satellite positioning assistance information as defined by claim 1, wherein the second mobile communication device is operated within range of a communications network with which the second mobile communication device is initially associated, the method further comprising initiating an off-network mode prior to establishing the asynchronous radio link.

4. A method of providing satellite positioning assistance information as defined by claim 1, wherein establishing the asynchronous radio link comprises establishing a half duplex link.

5. A mobile communication device, comprising:
    a communications transceiver;
    a satellite positioning receiver;
    a machine readable memory containing instruction code for operating the mobile communication device, including:
        establishing an asynchronous radio link directly with a peer mobile communication device;
        requesting current satellite positioning assistance information from the peer mobile communication device;
        receiving the current satellite positioning assistance information from the peer mobile communication device over the information link; and
        performing a satellite positioning location determination with the satellite positioning receiver using the current satellite positioning assistance information;
        wherein performing the satellite positioning location determination is commenced prior to receiving the current satellite positioning assistance information, and wherein, while commencing the satellite positioning location determination before receiving the current satellite positioning assistance information, the mobile communication device periodically checks an asynchronous radio channel to detect the peer mobile communication device transmitting the current satellite positioning assistance information.

6. A mobile communication device as defined by claim 5, wherein the mobile communication device is operated within range of a communications network with which the mobile communication device is initially associated, the machine readable memory further comprises instruction code for initiating an off-network mode of the mobile communication device prior to establishing the information exchange link.

* * * * *